Sept. 16, 1958  B. R. PAINE  2,851,960
OVERHEAD MONORAIL SYSTEM
Filed July 19, 1954

INVENTOR.
BILLIE R. PAINE
BY Hudson, Boughton,
Williams, David & Hoffmann
ATTORNEYS United States Patent Office 2,851,960
Patented Sept. 16, 1958

2,851,960

OVERHEAD MONORAIL SYSTEM

Billie R. Paine, Downey, Calif.

Application July 19, 1954, Serial No. 444,194

1 Claim. (Cl. 104—98)

The present invention relates to material handling, overhead, monorail carrier systems comprising an overhead transfer bridge having a carrier rail adapted to be selectively aligned with a carrier rail of one or more stationary tracks or transfer bridges and, more particularly, to mechanism for locking a transfer bridge to a stationary track or to another transfer bridge with the respective carrier rails in end-to-end alignment.

The principal object of the present invention is the provision of a new and improved, overhead, monorail carrier system having a transfer bridge selectively alignable with one or more stationary tracks or transfer bridges and comprising safety mechanism for limiting the movement of carriers toward the open ends of the respective rails, unless locked in proper alignment with another rail for transfer of a carrier from one rail to the other, in combination with means for preventing unlocking of the rails and, in turn, disalignment thereof until the safety mechanisms are operative or in position to operate, whereby all possibilities of a carrier wheel dropping off the end of a rail are eliminated.

Figure 2:
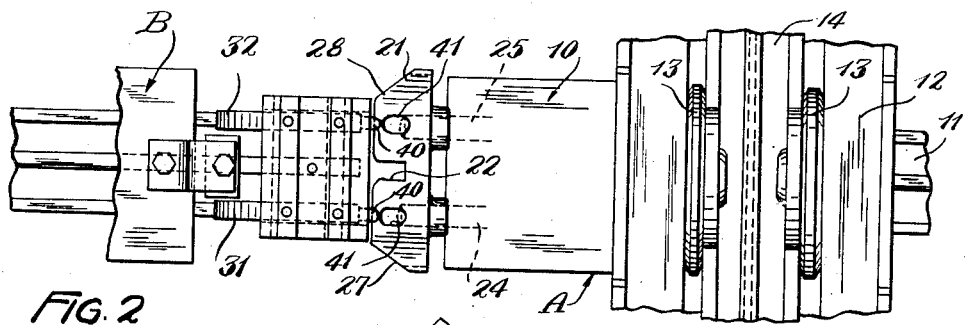
Figure 1:
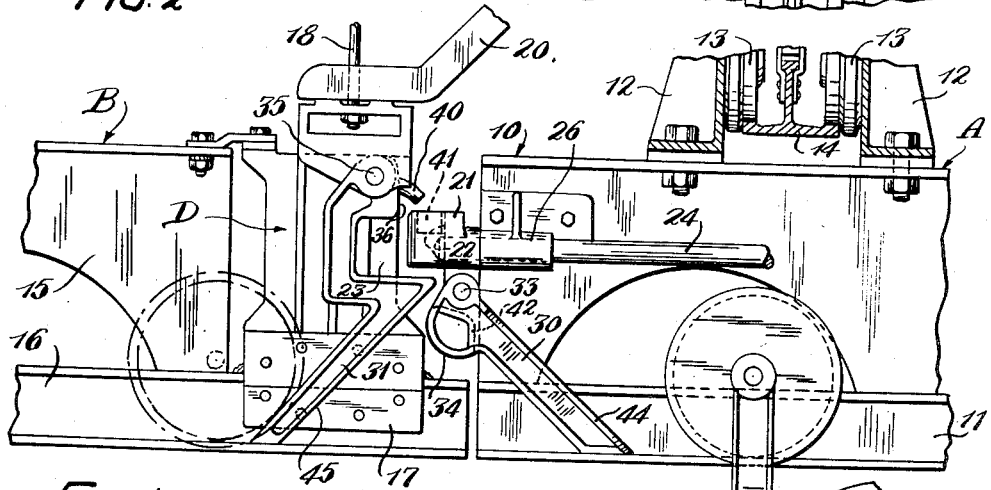
Figure 3:
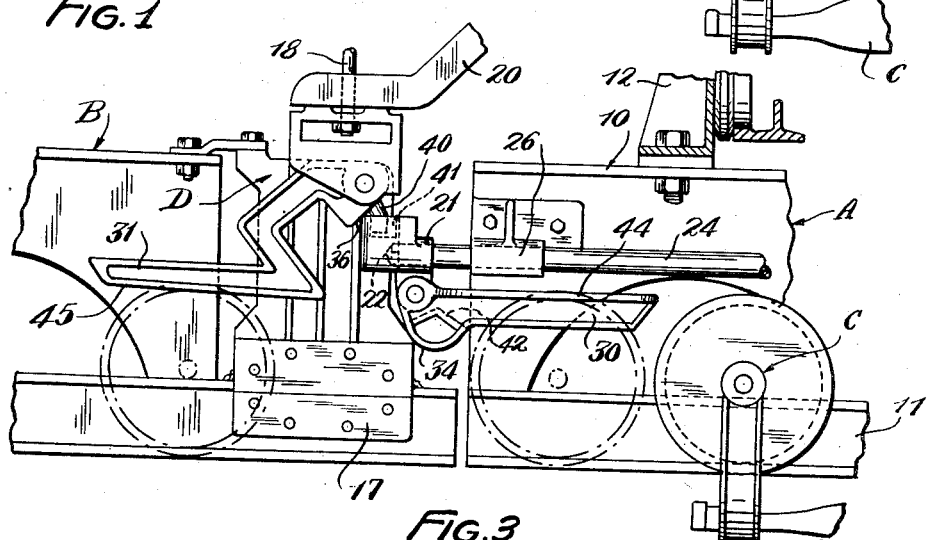

The invention resides in certain details of construction and combinations and arrangements of parts and further objects and advantages thereof will be apparent to those skilled in the art to which the invention relates from the following description of the preferred embodiment described with reference to the accompanying drawings forming a part of this specification, in which similar reference characters designate corresponding parts, and in which Fig. 1 is a fragmentary, side elevational view of a material handling overhead monorail carrier system embodying the invention;

Fig. 2 is a top plan view of the portion of the overhead carrier system shown in Fig. 1, part of which is broken away; and Fig. 3 is a view similar to Fig. 1 but showing the parts in a different operative position.

Referring now to the drawings, Fig. 1 is a view of a portion of an overhead, monorail carrier system showing one end of a hand-propelled, overhead, transfer bridge, designated generally at A, and an end portion of a stationary track support structure B. The transfer bridge A and structure B are shown in side elevation and positioned so that material handling carriers, designated generally as C and only a portion of one of which is shown, can be transferred from one to the other. The particular system illustrated is a hand-propelled or hand-powered system; in other words, the carriers and transfer bridges are propelled manually. The invention, however, is not limited to this type of powered system and it may be used as well with an electrified system in which the carriers or transfer bridges, or both, are electrically powered.

The transfer bridge A comprises a track assembly, including a girder 10 of T-section, to the lower part of which is welded a carrier rail 11 of inverted T-section, which rail forms the lower or tension member of the girder. The ends of the girder are suspended from end trucks 12, only one of which is shown, which trucks comprise wheels 13 rotatably supported by antifriction bearings and swiveling wheel yokes connected to opposite ends of the load bars of the trucks. The wheels 13 engage opposite sides, respectively, of inverted T-section rails 14 suspended from an overhead structure in a suitable manner and which form a runway for the transfer bridge A. The particular means by which the runway for the bridge is supported forms no part of the present invention and suffice it to say it is preferably suspended by hanger rods, not shown, to assist in relieving stresses, wheel flange friction, etc.

As is well understood in the art, the transfer bridge A is adapted to move along its runway into selective alignment with stationary tracks or other bridges and receive and transfer overhead carriers from one location to another. In the embodiment shown, the structure B is stationary and comprises a T-girder 15 having an inverted T-carrier rail 16 welded to the bottom thereof, which rail forms the lower or tension member of the girder. As seen in Fig. 1, the girder 15 terminates short of the end of rail 16 and a casting D is fixed thereon by side plates 17, only one of which is shown, riveted thereto and to the top of the rail 16. The girder 15 is suitably supported by means, including the hanger 18 and the bracket 20, so that the outer end of the rail 16 has the same elevation as the adjacent end of the bridge rail 11.

The bridge A is adapted to be locked against movement on its runway with the rails 11, 16 in end-to-end alignment by a locking member 21 which is adapted to interlock with a portion of the plate or casting D when the rails are aligned. The member 21 has a flared notch 22 therein which receives an edge portion 23 of plate D, as seen in Figs. 1 and 3, to interlock the member with the plate. The member 21, as shown, is attached to the ends of two rods 24, 25 located on opposite sides of girder 10 and are each slidingly supported by two spaced guide bushings 26, only one of which is shown. The rods 24, 25 and, in turn, the member 21 are adapted to be reciprocated between its retracted and locking positions shown in Figs. 1 and 3, respectively, in any convenient and suitable manner.

Preferably, the lock member 21 is spring-biased into its locking position and its outer face is provided with cam surfaces 27, 28 which slope rearwardly and are adapted to cooperate with the outer edge portion 23 of casting D to cam the lock member rearwardly or toward its retracted position as the operator aligns the rails 11, 16.

Safety mechanism in the form of pivoted stops, such as members or levers 30, 31 and 32, are provided to prevent the carrier wheels from accidentally rolling from the ends of the rails 11 or 16, respectively. These stops are adapted to be automatically raised and lowered by movement of the lock member 21 to its locking and retracted positions. The lever 30 is forked or split and the yoke thereof is pivoted to a depending web on the member 21 by a pin 33, with the legs of the lever straddling the web of the girder 10 and normally resting on the lateral flanges of the rail 11 in the path of carrier wheels traveling on the rail 11. As member 21 moves forwardly to interlock with casting D, the yoke portion 34 of the forked lever 30 strikes the adjacent edge of casting D or plates 17, which swings the legs of the lever upwardly about its pivot 33 as shown in Fig. 3. The stop at the adjoining end of the rail 16 comprises the two levers 31, 32 pivoted to casting D, one on either side thereof by a pin 35. Each of these levers is provided with a surface or edge 36 which is engaged by the member 21 as it moves forwardly to swing the levers upwardly, as shown in Fig. 3.

With the safety mechanism or levers 30, and 31 and 32 in the position shown in Fig. 3 and the aligned rails 11, 16 of the transfer bridge A and stationary track B securely locked in alignment, carriers may be safely moved from one rail to the other, with their wheels passing underneath the levers 30, and 31 and 32. According to the present invention, means is provided for preventing the lock member 21 from being retracted and the rails unlocked or released from one another, should a carrier stop in a position where one of its wheels could run off of the end of one of the rails in the event the rails became or were disaligned.

In the preferred embodiment shown, this is accomplished with respect to the track B by the provision of two pins 40, one on each of the levers 31, 32, which pins project into slots 41 in the lock member 21 as the levers 31, 32 are raised by the forward movement of the lock member 21, that is, movement of the lock member into locking position with an aligned rail; and with respect to the bridge A by the base of the lever 30, that is, the part to which the legs of the lever are attached, which is constructed to provide a surface 42 that abuts the end of the rail beam when the lever 30 is in its raised position, thereby preventing retraction of the lock member 21. The construction is such, however, that the edge 42 does not interfere with the normal operation of the lock member 21 and the lever 30 unless a carrier wheel is underneath the lever 30 and prevents its downward movement upon initial retraction of the lock member 21. For this purpose, as shown, the lever 30 is provided with laterally projecting flanges 44 which are adapted to engage the treads of the wheels of the carriers but underneath which the wheels normally pass. If the lever 30 is prevented from rotating or dropping by a carrier wheel upon initial retraction thereof, the edge 42 will engage the end of the rail web and prevent further retraction of the lock member 21 before the transfer bridge A is released from the other track and is free to move transversely of the rails.

In a similar manner to that just described with respect to the lever 30, the edge 45 of the levers 31 and 32 underneath which edge the carrier wheels pass, is such that it will engage a carrier wheel located on the end of the rail 16 any place between the left-hand end of the stop levers 31 and 32 and the right-hand end of the rail, as viewed in the drawings, and arrest further downward movement of the lever before the pin or projection 40 has released the lock member 21 or permitted its movement to the right sufficient to disengage the edge 23 of the casting D from the slot 22.

It will be seen that objects and the advantages enumerated as well as others have been achieved, and that there is provided an overhead monorail system having locking mechanism for a transfer or traveling bridge which will prevent movement of the bridge with a carrier improperly thereon on the adjacent track.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

Having thus described my invention, I claim:

In an overhead carrier system having a supporting structure for a carrier rail and a transfer bridge structure having a carrier rail, said bridge structure transporting the latter carrier rail transversely of and into end to end alignment with the other rail, locking means for securing said rails in end to end alignment comprising a latch member slidably mounted upon one of said structures, said latch member having spaced slots with a notch therebetween for receiving the end of the other of said structures and interlocking said rails when said rails are aligned, stop members pivotally connected to the end of said other structure for movement into and out of a position in the path of the wheels of a carrier on said rails, said latch member engaging said stop members and moving them about their pivot and out of the path of the carrier wheels when said rails are aligned, said stop members having pins on the ends thereof engageable with said slots upon the pivotal movement of the stop members for preventing movement of said latch member toward non-interlocking position, stop members pivotally connected to said latch member and having a portion thereof engageable with the end of said other structure for camming said stop members about their pivot and out of the path of the carrier wheels, said last mentioned stop members in their raised position having a surface thereof engageable with the end of structure upon which they are mounted for preventing movement of said latch member toward non-interlocking position.

References Cited in the file of this patent

UNITED STATES PATENTS

| | | |
|---|---|---|
| 2,276,272 | Harris et al. | Mar. 17, 1942 |
| 2,411,218 | Mappin | Nov. 19, 1946 |
| 2,642,814 | Anjeskey | June 23, 1953 |